April 14, 1970  J. R. EVANS  3,506,044

PORTABLE POWER TOOL

Filed July 18, 1967  3 Sheets-Sheet 1

JOHN R. EVANS
INVENTOR.

BY
HIS ATTORNEYS

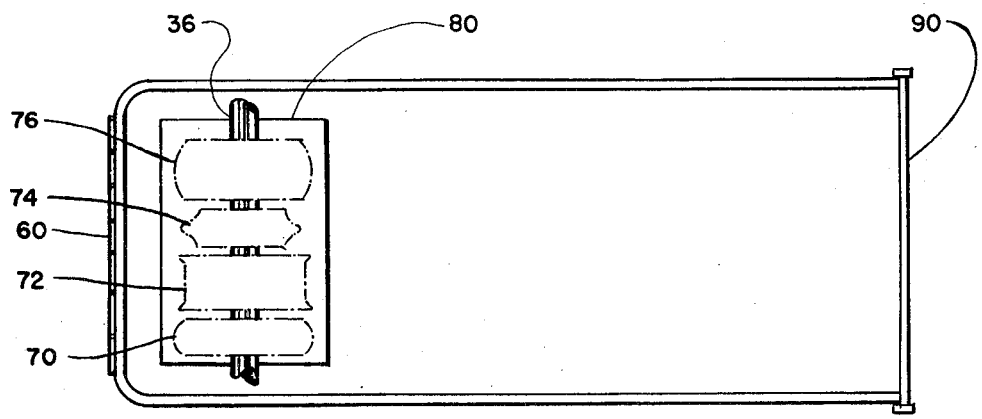
Fig. 3
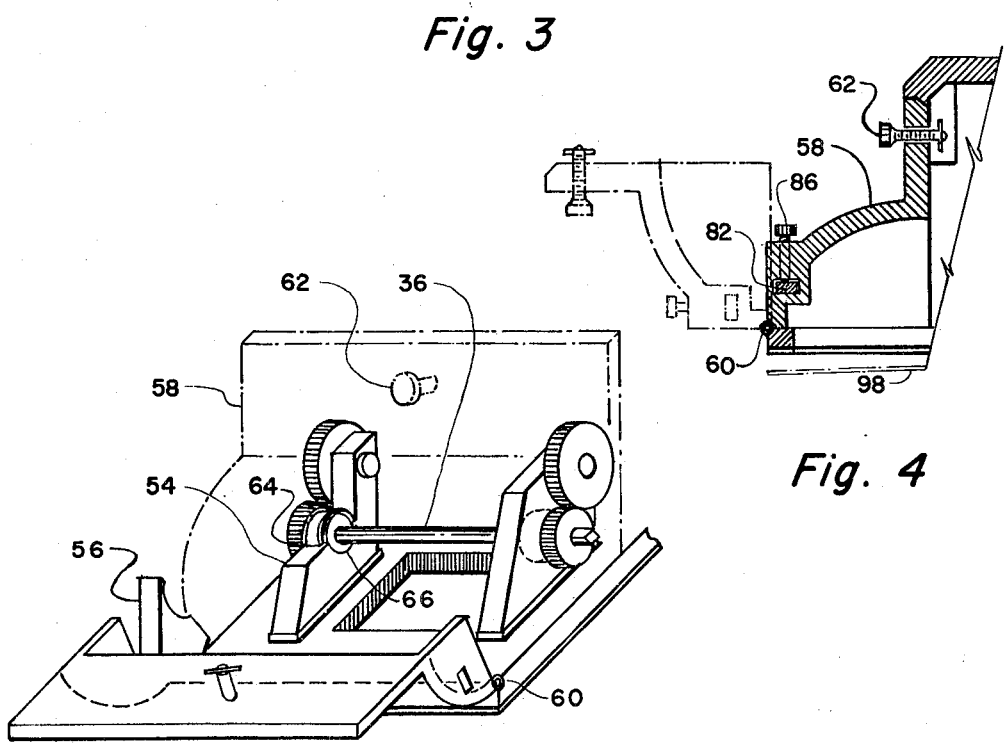
Fig. 4
Fig. 5

JOHN R. EVANS
*INVENTOR.*

HIS ATTORNEYS

United States Patent Office 3,506,044
Patented Apr. 14, 1970

3,506,044
PORTABLE POWER TOOL
John R. Evans, Pittsburgh, Pa., assignor of fifty percent to Joseph B. Bagley, Pittsburgh, Pa.
Filed July 18, 1967, Ser. No. 654,159
Int. Cl. B27c *9/02;* B27b *9/00, 1/10*
U.S. Cl. 144—39     15 Claims

ABSTRACT OF THE DISCLOSURE

A portable power tool is disclosed which is capable of performing various finishing operations including various types of sawing and planing operations. The various finishing heads can be detachably mounted on an output drive shaft which in turn is readily removable from the power tool to facilitate changing heads. The power tool is provided with unique power train and bearing arrangements. In one arrangement, the power tool is modified for use with a quick attach circular saw attachment. The depth of cut of the power tool can be modified without de-energizing the power tool or removing the power tool from the workpiece.

---

The present invention relates to a portable power tool for use in woodworking or for various grinding applications. More particularly the invention contemplates a tool of the character described having easily replaced or multiple, rotating cutting heads to perform planing, shaping, molding, sawing, jointing, sanding, polishing, grinding, or other finishing applications.

In the past many forms of portable power tools have been proposed for such finishing operations. Prior power tools for the most part are capable of only a single one of such applications. In almost every case, the cutting, grinding, or other finishing head could not be easily interchanged with a finishing head of differing function. For example, although a shaper can usually be provided with differing shapes of cutting heads for various types of moldings, the shaper could not be readily converted to a jointer-planer, sander, or power hand saw.

In those prior portable power tools wherein the finishing heads could be changed the change was accomplished only with considerable difficulty. The change-over usually involved an expenditure of considerable time and/or the use of expensive parts.

Many existing portable power tools also suffered from the disadvantage that the depth of cut could not be readily or quickly adjusted. In those power tools in which an adjustment is possible, it was usually necessary to disconnect the tool and partially disassemble it in order to make the adjustment. Many of the previously proposed portable power tools are provided with improper or inadequate cutter guards to minimize the chances of injury to the user. Even those prior tools having adequate guards or hoods, required an expenditure of considerable time to remove the guard or hood for blade-changing, cleaning, maintenance and repair purposes.

Owing to the structure of previously proposed power tools, the cutting head, such as a planing or sanding head, is located some distance from the end of the power tool. Accordingly, the power tool is incapable of performing sanding, planing or other cutting operations, depending upon the character of the tool, into an inside corner or other relatively inaccessible area, because of the projecting end portion of the power tool. These disadvantages are particularly evident in hanging doors for example. It is frequently necessary to plane the leaking edge of the door after the door is hung in order to secure a proper fit into the door jamb. Where the door is not properly sized before hanging or where the door jamb is not quite plumb for example, it has been necessary when using conventional power or hand tools to remove the door for resizing the same.

I overcome these disadvantages of the prior art by providing a universal portable power tool which is capable of utilizing replaceable cutting, sanding, grinding or other finishing heads to perform the various functions described above. I provide novel quick-attach and detach means for removing driven means from the driven shaft of the tool on which the various heads are arranged, and further for separating the cutting, grinding or sanding heads from the shaft to permit ready interchangeability thereof.

I also provide means for quickly and effectively adjusting the depth of cut of my novel power tool from the upper side or top surface thereof. The depth adjustment can be made safely without de-energizing the tool. Thus, considerable time is saved in making such adjustment.

I also provide a novel gearing arrangement for the symmetrical delivery of output torque of a single drive means to each end of the aforementioned output shaft. The portable tool also provides novel means for mounting the gearing arrangement and the output shaft with reference to novel bearing arrangements. I also provide an effective and readily removed or opened hood or shield for the moving and replaceable components of my apparatus.

Finally, the portable tool is arranged with the cutting, grinding, or sanding head very close to one end thereof so that the tool can be utilized in otherwise inaccessible areas, for example in planing the entire leading edge of a door without removing the door from its hung position.

I accomplish these desirable ends by providing a portable power tool comprising a casing, a keyed output shaft rotatably and removably mounted on said casing, drive means mounted within said casing in driving engagement with said shaft to rotate said shaft, one end of said shaft being removably inserted into antifrictional means therefor fixedly mounted on said casing, at least one finishing head keyingly and removably mounted on said shaft for rotation therewith and extending through an access aperture therefor in said casing, removable antifrictional means for said shaft engaging the other end of said shaft, and means for removably mounting said removable antifrictional means on said casing.

I also desirably provide a portable power tool wherein said casing includes a removable hood covering said shaft and said finishing head, and said removable antifrictional means mounting means are supported on said hood and an adjacent part of said casing.

I also desirably provide a portable power tool wherein at least one of said antifrictional means include inner and outer races with the inner race thereof being keyingly engaged with said output shaft, and shaft rotating means are mounted on said inner race and are coupled to said driving means for rotating said shaft.

I also desirably provide a portable power tool wherein said casing is provided with a base plate including said aperture, a depth of cut plate is hingedly mounted on the underside of said base plate, said depth of cut plate having an aperture therein positioned to underlie said access aperture and shaped in congruency therewith, and means for hingedly positioning said depth plate relative to said base plate to determine the depth of cut of said finishing head.

I also desirably provide a portable power tool wherein said output shaft and associated components and said access aperture are disposed closely adjacent an end of said casing to permit said tool to be utilized in otherwise inaccessible locations.

I also desirably provide a portable power tool wherein a keyed portion of said output shaft projects through an aperture in the side of said casing, a circular saw attachment is removably engageable with said casing, said attachment including a saw blade keyingly engageable with said projecting shaft end.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIGURE 3 is a bottom plan view of the apparatus as shown in FIGURE 1;

FIGURE 4 is a partial right side elevational view of the apparatus shown in the preceding figures and illustrating the open and closed positions of the hinged hood thereof;

FIGURE 5 is a partial, isometric view of the apparatus as shown in FIGURES 1 and 2 with the hood thereof in the open position;

FIGURE 9 is a cross-sectional view of the output shaft of FIGURE 8 and taken along reference line IX—IX thereof;

Figure 1:
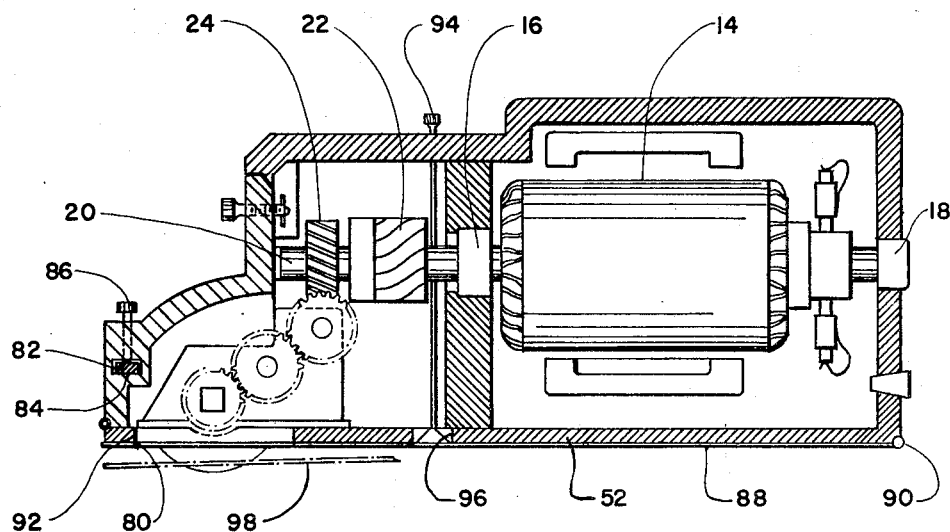
FIGURE 1 is a left side elevational view of one form of portable power tool arranged in accordance with my invention, with the casing broken away.
Figure 2:
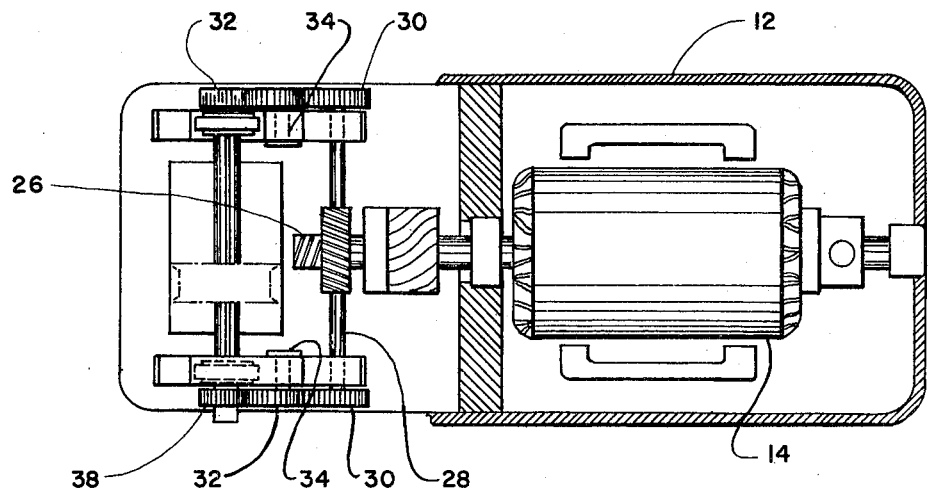
FIGURE 2 is a top plan view of the apparatus as shown in FIGURE 1, with the case thereof being broken away.
Figure 6:
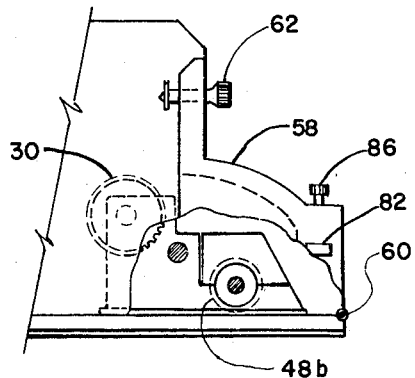
FIGURE 6 is a partial, left side elevational view of the apparatus with parts broken away.

Referring now to FIGURES 1–9 of the drawings and initially to FIGURES 1–3 thereof, my novel, portable power tool 10 as shown therein comprises a case 12 having motor 14 mounted within the case 12 in the usual manner. For example, motor 14 as better shown in FIGURE 1 includes bearings 16 and 18 for its shaft 20, on which is mounted air circulating fan 22 and helical output gear 24.

Motor gear 24 in this example is enmeshed with a similar helical gear 26 on shaft 28, on each end of which is mounted spur gear 30. Each of the spur gears 30 is enmeshed with an idler gear 32 mounted on stub shaft 34 on each side of the case 12 as better shown in FIGURE 2. The idler gears 32, 32 thus provide a symmetrical delivery of power to output shaft 36 (FIGURE 3) through driven gears 38 which are keyed to output shaft 36 for rotation therewith.

Figure 7:
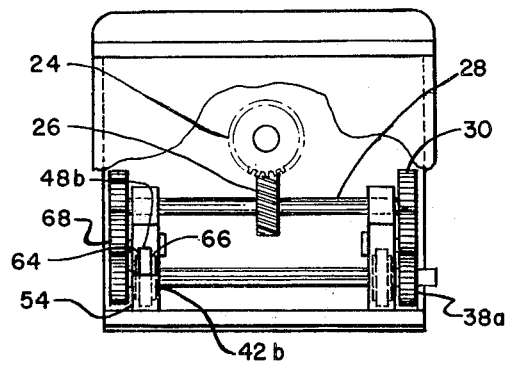
FIGURE 7 is a front elevational view of the apparatus as shown in the preceding figures with the hood thereof removed.
Figure 8:
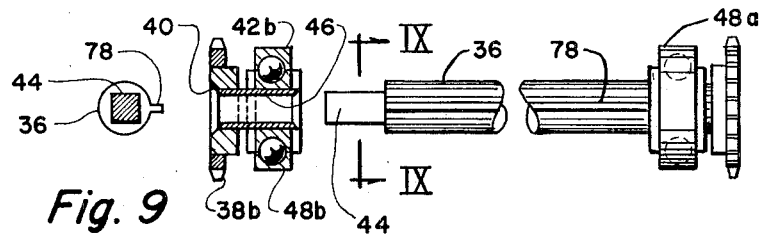
FIGURE 8 is an enlarged, partially exploded view of the output shaft and bearing assembly shown in FIGURE 7.

As better shown in FIGURES 7 and 8 each of driven gears 38 are mounted on inner race 40 of an associated ball bearing or other antifrictional means 42. In furtherance of this purpose driven gear 38 can be pressed or shrunk-fitted on the outer projecting portion of the inner bearing race 40 for rotation therewith. As better shown in FIGURES 1, 2, 5, 7–9, output shaft 36 is provided with keyed end portions 44, for example, of square cross-sectional configuration, for keyed insertion into a complementary shaped opening 46 of each bearing and gear assembly 38–42. The shaft ends 44 thus are closely but removably fitted into keyed bearing apertures 46 so that output gears 38 are coupled to the output shaft 36 for driving rotation therewith.

As better shown in FIGURES 2, 5 and 7 one of the bearings 42, for example, the right hand bearing 42a, can be more or less permanently mounted on the case 12 for example by pressing its outer race 48a into a suitable aperture formed in abutment 50 mounted on base plate 52 but spaced from the adjacent wall of case 12 to permit access to driven gear 38a as better shown in FIGURE 7.

On the other hand outer bearing race 48b of bearing 42b is mounted in a close fitting but removable manner in a recess in partial abutment 54 likewise mounted on base 52 and spaced from the adjacent wall of casing 12. A partial but complementary abutment 56 is mounted on the inner surface of hood 58 hinged at 60 to base 52 as better shown in FIGURES 5 and 6. Partial abutment 56 is likewise spaced from the adjacent side wall of hood or shield 58 so as not to interfere with the operation of driven gear 38b and idler gear 32.

With this arrangement when hood 58 is opened after disengaging screw or spring lock 62, bearing 42b can be withdrawn laterally of casing 12 or longitudinally of output shaft 36. When hood 58 is closed the removable bearing and gear assembly 38b–42b are retained between lips 64 and 66 (FIGURE 5) on complementary abutment portions 54 and 56 respectively on one side and depending covered portion 68 on the other side forming part of protective hood 58 and engageable with the adjacent end of inner bearing race 40b.

After removal of the bearing and gear assembly 38b–42b in this manner output shaft 36 can be removed in the same direction by withdrawing it through one or more cutters, shapers, grinders, sanders or other finishing heads, for example, cutters 70, 72, 74 and 76 shown in FIGURE 3 and from its keyed engagement with the fixed right hand gear and bearing arrangement 38a–48a. Cutters 70–76 are likewise closely fitted but keyingly and removably mounted on shaft 36 for rotation therewith by means of output shaft and suitable keying means such as spline 78 (FIGURE 9) with the shaft and spline 36, 78 being inserted into complementary apertures in each of the cutters 70–76. With the removal of output shaft 36 cutters 70–76 can be removed from the power tool 10 through access slot 80 therefor in base palte 52 (FIGURE 1).

With this arrangement it will be apparent that various cutting, grinding, sanding and other finishing heads can be readily inserted and removed from my novel power tool 10, simply by opening the protective hood 58. Of course, when the hood is reclosed its depending sidewalls entirely enclose cutting head 70–76 and other rotating parts of the tool 10 as better shown in FIGURES 5 and 6, with the exception of the cutting surfaces thereof projecting through bottom opening 80. As shown in FIGURE 1 hood 58 can be provided with an extensible guide rod or bar 82 mounted in transverse slot 84 of hood 58 and secured therein by a set screw 86. The guide 82 can be employed for maintaining a preselected distance between the tool and a straight edge or other guiding surface as the tool is moved therealong.

In order precisely to determine the depth of cut made by the cutting head 70–76 or other finishing head mounted on splined output shaft 36, a depth-of-cut plate 88 is mounted so as to underlie base plate 52 and desirably is hinged thereto at the rearward end of plates 52, 88 as denoted by reference character 90. The depth-of-cut plate likewise is provided with a cutting head access aperture 92 which desirably is congruent with the aperture 80 in base plate 52 for the purpose. Depth plate 88 can be hingedly moved relative to base plate 52 by means of adjustment screw 94 threaddedly engaged in a top portion of casing 12 and rotationally engaged to depth plate 88, as better shown in FIGURE 1. Base plate 52 is provided with aperture 96 to accommodate the passage of the adjustment screw 94. In the example shown in FIGURE 1 adjustment screw 94 can move depth plate 88 between its solid outline position in FIGURE 1 and its chain outline position 98, in order to afford the thus-indicated range of cutting depth.

Figure 10:
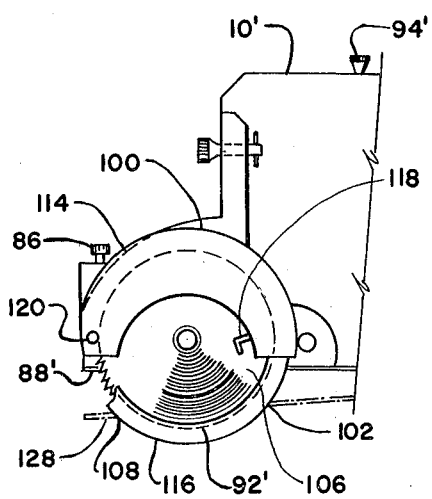
FIGURE 10 is a partial, side elevational view of the apparatus shown in the preceding figures and illustrating a novel circular saw attachment therefor.
Figure 11:
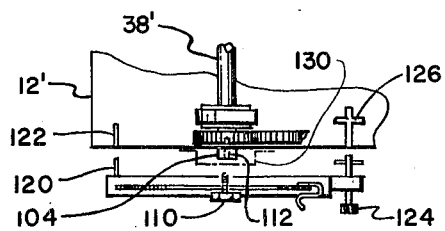
FIGURE 11 is a partial top plan view of the apparatus as shown in FIGURE 10, with parts broken away.

Referring now to FIGURES 10 and 11 of the drawings, an alternative circular saw attachment 100 can be provided for power tool 10' in accord with another feature of my invention. In the later arrangement keyed output shaft 38' is arranged with one of its keyed end portions, for example the right hand end portion projecting a short distance through case 12 by means of aperture 102 therein, as denoted by reference character 104 (FIGURE 11).

When the saw assembly 100 is mounted on the casing 12' as described herein, the shaft projection 104 projects through saw blade 106 which desirably is provided with a complementary central, keyed aperture 108 (FIGURE 10). When the saw assembly 100 is thus mounted, screw 110 insertable in tapped recess 112 of shaft end 104 secures the saw blade 106 to the projecting shaft end 104.

Saw assembly 100 is provided with a fixed upper guard 114 and a movable, spring loaded lower guard 116 which is mounted in the conventional manner on upper guide 114 and can be moved manually by finger tab 118. The saw assembly 100 is mounted on the casing 12' by means of positioning pin 120 inserted in recess 122 of case 12', and by a spring-loaded locking device 124 which can be inserted and locked into a complementary aperture 126 therefor in case 12', as better shown in FIGURE 11 of the drawings.

With the arrangement as shown in FIGURES 10 and 11, the portable power tool of the invention, in addition to its functions described previously, can be utilized as a portable or hand power saw. In furtherance of this purpose the cutting, grinding, or sanding heads, such as the heads 70–76 can be removed in the manner described above before the saw blade 106 is secured to shaft 38', or alternatively depth plate 88' can be adjusted downwardly by adjustment screw 94' such that the aforesaid finishing heads, if left in posiltion, do not project through the depth plate access opening 96'. It is also contemplated that depth plate 88' can be provided with a correspondingly greater degree of hinging movement by the adjusting screw 94' so that the saw attachment 100 can be used for pocket cuts when desired. In furtherance of this purpose depth plate 88' desirably can be adjusted downwardly to its chain outline position 128 in FIGURE 10.

When the saw attachment 100 is not in use and is removed from the casing 12', a cover plate 130, shown in chain outline in FIGURE 11, can be secured to the casing 12' so as to cover the projecting end 104 of shaft 38'.

From the foregoing, it will be seen that I have disclosed novel and efficient forms of portable power tools herein.

While I have shown and described certain presently preferred embodiments of the invention and certain presently preferred methods of practicing the same, it is to be distinctly understood that the invention is not limited thereto but may be otherwise variously embodied and practiced within the scope of the following claims.

I claim:

1. A portable power tool comprising a casing, a keyed output shaft rotatably and removably mounted on said casing, drive means mounted within said casing in driving engagement with said shaft to rotate said shaft, one end of said shaft being removably and keyingly inserted into antifrictional means therefor fixedly mounted on said casing, at least one finishing head keyingly and removably mounted on said shaft for rotation therewith and extending through an access aperture therefor in said casing, removable antifrictional means secured to the other end of said shaft for removal therewith, and quick-release clamp means for removably mounting said removable antifrictional means on said casing.

2. A portable power tool comprising a casing, a keyed output shaft rotatably and removably mounted on said casing, drive means mounted within said casing in driving engagement with said shaft to rotate said shaft, one end of said shaft being removably inserted into antifrictional means therefor fixedly mounted on said casing, at least one finishing head keyingly and removably mounted on said shaft for rotation therewith and extending through an access aperture therefor in said casing, removable antifrictional means for said shaft engaging the other end of said shaft, and means for removably mounting said removable antifrictional means on said casing, said casing including a removable hood covering said shaft and said finishing head, and said removable antifrictional means mounting means being supported on said hood and an adjacent part of said casing.

3. A portable power tool comprising a casing, a keyed output shaft rotatably and removably mounted on said casing, drive means mounted within said casing in driving engagement with said shaft to rotate said shaft, one end of said shaft being removably inserted into antifrictional means therefor fixedly mounted on said casing, at least one finishing head keyingly and removably mounted on said shaft for rotation therewith and extending through an access aperture therefor in said casing, removable antifrictional means for said shaft engaging the other end of said shaft, means for removably mounting said removable antifrictional means on said casing, at least one of said antifrictional means including inner and outer races with the inner race thereof being keyingly engaged with said output shaft, and shaft rotating means mounted on said inner race and coupled to said driving means for rotating said shaft.

4. The combination according to claim 3 wherein each of said antifrictional means include inner races keyingly engaged with said output shaft, a pair of output gears are mounted respectively on said inner races for rotation therewith, and said driving means includes a gearing train enmeshed with each of said output gears of symmetrical delivery of power to said output shaft.

5. A portable power tool comprising a casing, a keyed output shaft rotatably and removably mounted on said casing, drive means mounted within said casing in driving engagement with said shaft to rotate said shaft, one end of said shaft being removably inserted into antifrictional means therefor fixedly mounted on said casing, at least one finishing head keyingly and removably mounted on said shaft for rotation therewith and extending through an access aperture therefor in said casing, removable antifrictional means for said shaft engaging the other end of said shaft, means for removably mounting said removable antifrictional means on said casing, said casing being provided with a base member and a hood for covering said shaft and said finishing head, first abutment means mounted on said base member for permanently enclosing said fixed antifrictional means, and severable abutment means mounted on said base structure and on said hood for cooperatively engaging said removable antifrictional means.

6. The combination according to claim 5 wherein said hood is provided with depending sidewall means for covering said abutment means and said antifrictional means in the closed position of said hood.

7. The combination according to claim 1 wherein said casing is provided with a base plate including said aperture, a depth of cut plate is hingedly mounted on the underside of said base plate, said depth of cut plate having an aperture therein positioned to underlie said access aperture and shaped in substantial congruency therewith, and means for hingedly positioning said depth plate relative to said base plate to determine the depth of cut of said finishing head.

8. The combination according to claim 7 wherein said adjustment means includes an elongated rod rotatably secured to said depth plate and passing upwardly through said casing, said rod having a threaded portion threadedly engaging an upper portion of said casing so that said depth of cut plate can be adjusted by turning said rod without de-energizing said tool and without removing said tool from a workpiece.

9. The combination according to claim 2 wherein a guide bar is slidably mounted on said hood.

10. The combination according to claim 1 wherein a keyed portion of said output shaft projects through said fixed antifrictional means and through an aperture in the side of said casing, a circular saw attachment is removably engageable with said casing, said attachment including a saw blade keyingly engageable with said projecting shaft portion.

11. A portable power tool comprising a casing, a keyed output shaft rotatably and removably mounted on said casing, drive means mounted within said casing in driving engagement with said shaft to rotate said shaft, one end of said shaft being removably inserted into antifrictional means therefor fixedly mounted on said casing, at least one finishing head keyingly and removably mounted on said shaft for rotation therewith and extending through an access aperture therefor in said casing, removable antifrictional means for said shaft engaging the other end of said shaft, means for removably mounting said removable antifrictional means on said casing, a keyed portion of said output shaft projecting through an aperture in the side of said casing, a circular saw attachment removably engageable with said casing, said attachment including a saw blade keyingly engageable with said projecting shaft portion, said saw attachment being engageable with said casing by means of a positioning pin mounted on one of said attachment and said casing and removably insertable into a recess therefor on the other of said attachment and said casing, and by cooperative quick-attach lock and recess means formed on said attachment and on said casing.

12. The combination according to claim 5 wherein said abutment means are spaced inwardly of said casing to accommodate shaft rotating means coupled to said shaft and positioned between said casing and said abutment means.

13. The combination according to claim 12 wherein said severable abutment means cooperatively define a recess closely receiving an outer race of said removable antifrictional means and having a retaining lip to restrain one side of said removable antifrictional means by engagement with its outer race, the other side of said removable antifrictional means being restrained by engagement of its inner race with an adjacent wall surface of said casing.

14. A portable power tool comprising a casing, a removable rotatably mounted output shaft within said casing, drive means mounted within said casing in driving engagement with said shaft to rotate said shaft, fixed and removable antifrictional means supported within said casing for rotatably mounting said shaft, a keyed end portion of said shaft projecting through said fixed antifrictional means and through an aperture in the adjacent wall of said casing, a circular saw attachment including a guard housing, quick attach means for removably securing said guard housing to said casing adjacent said projecting shaft portion, said attachment in addition including a saw blade keyingly engageable with said projecting shaft end.

15. The combination according to claim 1 wherein said quick-release means include severable abutment members mounted on said casing for cooperatively engaging said removable antifrictional means, and means for separating said abutment members.

References Cited
UNITED STATES PATENTS

| | | | |
|---|---|---|---|
| 1,296,911 | 3/1919 | Bloodgood | 145—4 |
| 1,410,554 | 3/1922 | Dernbach | 145—4 |
| 1,457,492 | 6/1923 | Bloodgood | 145—4 |
| 2,246,761 | 6/1941 | Saliba et al. | 143—43 |
| 2,589,309 | 3/1952 | Tompkins | 143—159 |
| 2,719,553 | 10/1955 | Ballard | 145—4 |

GIL WEIDENFELD, Primary Examiner

U.S. Cl. X.R.

143—43, 159; 145—4; 51—170